United States Patent
Sanno

(10) Patent No.: US 9,560,265 B2
(45) Date of Patent: Jan. 31, 2017

(54) IMAGE PROCESSING APPARATUS, IMAGE PROCESSING METHOD, IMAGE PROCESSING PROGRAM, AND IMAGING APPARATUS

(71) Applicant: CANON KABUSHIKI KAISHA, Tokyo (JP)

(72) Inventor: Masato Sanno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 91 days.

(21) Appl. No.: 14/313,812

(22) Filed: Jun. 24, 2014

(65) Prior Publication Data
US 2015/0009356 A1    Jan. 8, 2015

(30) Foreign Application Priority Data
Jul. 2, 2013   (JP) .................. 2013-138856

(51) Int. Cl.
H04N 5/232   (2006.01)
H04N 5/235   (2006.01)
H04N 5/355   (2011.01)

(52) U.S. Cl.
CPC ........ H04N 5/23219 (2013.01); H04N 5/2355 (2013.01); H04N 5/35581 (2013.01); G06T 2207/20208 (2013.01)

(58) Field of Classification Search
CPC .............. H04N 5/2355; H04N 5/23219; H04N 5/23293; H04N 5/2351; H04N 5/35581; H04N 5/2352; H04N 5/2356; H04N 5/23229; H04N 5/23254; H04N 5/35554; G06T 2207/20208; G06T 2207/10144; G06T 2207/30201
See application file for complete search history.

(56) References Cited

U.S. PATENT DOCUMENTS

| | | | |
|---|---|---|---|
| 6,833,864 B1 * | 12/2004 | Ashida | H04N 5/235 348/207.99 |
| 7,103,199 B2 * | 9/2006 | Watanabe | G06K 9/325 382/105 |
| 8,358,350 B2 * | 1/2013 | Watanabe | G06K 9/00295 348/169 |
| 8,554,010 B2 | 10/2013 | Hasegawa | |

(Continued)

FOREIGN PATENT DOCUMENTS

| | | |
|---|---|---|
| JP | 11-201741 A | 7/1999 |
| JP | 2009-278155 A | 11/2009 |

(Continued)

OTHER PUBLICATIONS

Japanese Office Action dated Nov. 12, 2015 in Japanese Patent Application No. 2013-138856.

*Primary Examiner* — Michael Osinski
(74) *Attorney, Agent, or Firm* — Fitzpatrick, Cella, Harper & Scinto

(57) ABSTRACT

An image processing apparatus, which processes a plurality of image data obtained by picking up images of an object in different photographing conditions, combines the plurality of image data and generate combined image data, and switches between execution of determination processing for determining the object included in the image on at least one of the plurality of image data and execution of the determination processing on the combined image data.

10 Claims, 6 Drawing Sheets

(56) References Cited

U.S. PATENT DOCUMENTS

| | | | | |
|---|---|---|---|---|
| 9,131,149 B2* | 9/2015 | Ohashi | | H04N 5/232 |
| 9,131,201 B1* | 9/2015 | Geiss | | H04N 5/235 |
| 2003/0156755 A1* | 8/2003 | Watanabe | | G06K 9/325 |
| | | | | 382/182 |
| 2004/0136603 A1* | 7/2004 | Vitsnudel | | G06T 5/004 |
| | | | | 382/254 |
| 2004/0207743 A1* | 10/2004 | Nozaki | | H04N 5/23212 |
| | | | | 348/333.12 |
| 2005/0057662 A1* | 3/2005 | Washisu | | H04N 5/2253 |
| | | | | 348/208.99 |
| 2005/0187437 A1* | 8/2005 | Matsugu | | A61B 5/16 |
| | | | | 600/301 |
| 2005/0212913 A1* | 9/2005 | Richter | | G06K 9/00228 |
| | | | | 348/170 |
| 2006/0210264 A1* | 9/2006 | Saga | | G03B 13/30 |
| | | | | 396/287 |
| 2007/0030381 A1* | 2/2007 | Maeda | | G03B 13/36 |
| | | | | 348/345 |
| 2008/0024616 A1* | 1/2008 | Takahashi | | H04N 5/2351 |
| | | | | 348/221.1 |
| 2008/0025710 A1* | 1/2008 | Sugimoto | | G03B 17/00 |
| | | | | 396/48 |
| 2009/0003652 A1* | 1/2009 | Steinberg | | G06K 9/00228 |
| | | | | 382/103 |
| 2009/0066803 A1* | 3/2009 | Miyata | | H04N 5/232 |
| | | | | 348/222.1 |
| 2010/0020194 A1* | 1/2010 | Hirooka | | H04N 5/23219 |
| | | | | 348/229.1 |
| 2010/0066840 A1* | 3/2010 | Asukai | | G06T 5/50 |
| | | | | 348/207.1 |
| 2010/0150473 A1* | 6/2010 | Kwon | | G06T 5/50 |
| | | | | 382/284 |
| 2010/0157078 A1* | 6/2010 | Atanassov | | G06T 5/007 |
| | | | | 348/222.1 |
| 2010/0194925 A1* | 8/2010 | Kubota | | H04N 5/23212 |
| | | | | 348/234 |
| 2011/0069205 A1* | 3/2011 | Kasai | | G06T 7/2053 |
| | | | | 348/239 |
| 2011/0222793 A1* | 9/2011 | Ueda | | H04N 5/2355 |
| | | | | 382/284 |
| 2012/0020556 A1* | 1/2012 | Manabe | | H04N 5/2355 |
| | | | | 382/167 |
| 2012/0051594 A1* | 3/2012 | Kim | | G06K 9/00771 |
| | | | | 382/103 |
| 2012/0188432 A1* | 7/2012 | Kubota | | H04N 5/2355 |
| | | | | 348/333.01 |
| 2012/0287294 A1* | 11/2012 | Kaizu | | H04N 5/2355 |
| | | | | 348/208.4 |
| 2013/0076937 A1* | 3/2013 | Tajima | | H04N 5/355 |
| | | | | 348/223.1 |
| 2013/0076973 A1* | 3/2013 | Kobayashi | | H04N 5/2356 |
| | | | | 348/362 |
| 2013/0120607 A1* | 5/2013 | Manabe | | H04N 5/2355 |
| | | | | 348/223.1 |
| 2014/0218559 A1* | 8/2014 | Yamaguchi | | H04N 5/2352 |
| | | | | 348/229.1 |
| 2014/0232929 A1* | 8/2014 | Ichikawa | | H04N 5/2355 |
| | | | | 348/362 |
| 2014/0253792 A1* | 9/2014 | Watanabe | | H04N 5/2353 |
| | | | | 348/362 |
| 2014/0307129 A1* | 10/2014 | Feng | | H04N 5/2173 |
| | | | | 348/242 |
| 2014/0347521 A1* | 11/2014 | Hasinoff | | H04N 5/2355 |
| | | | | 348/239 |
| 2014/0362281 A1* | 12/2014 | Yamada | | H04N 5/23219 |
| | | | | 348/362 |
| 2015/0009352 A1* | 1/2015 | Shibagami | | H04N 5/2355 |
| | | | | 348/218.1 |

FOREIGN PATENT DOCUMENTS

| | | |
|---|---|---|
| JP | 2011-023985 A | 2/2011 |
| JP | 2011-244309 A | 12/2011 |

\* cited by examiner

IMAGE PROCESSING APPARATUS, IMAGE PROCESSING METHOD, IMAGE PROCESSING PROGRAM, AND IMAGING APPARATUS

BACKGROUND OF THE INVENTION

Field of the Invention

The present invention relates to an image processing apparatus and an image processing method. In particular, the present invention relates to an image processing apparatus, an image processing method, and an imaging apparatus, which can perform a face detection function in moving image processing.

Description of the Related Art

Conventionally, there have been known technologies including face detection processing for detecting a human face in an image, face recognition processing for recognizing a person of the detected face, and facial expression determination processing for determining a facial expression of the detected face. If the image includes a blocked up shadow area or a flared highlight area, the above-mentioned processings cannot be performed accurately for the area.

Therefore, in Japanese Patent Application Laid-Open No. 2009-278155, there is disclosed a method of generating a plurality of moving image signals of different exposures in face detection in moving image photographing and performing the face detection based on each moving image signal, thereby preventing a face from being not detected due to photographing against light or the like.

However, reading-out of a plurality of frames of different exposures and further performing the face detection processing on each of the plurality of frames result in increase of the number of frames on which the face detection processing and the like are performed, and hence time necessary for completing the processings is increased.

Here, as described in Japanese Patent Application Laid-Open No. 2011-23985, there has been known a technology of generating one frame image signal having reduced blocked up shadow areas and flared highlight areas by combining a plurality of image data of different exposure amounts. By performing the face detection processing, the face recognition processing, or the facial expression determination processing using a frame image signal of broader dynamic range generated by combining a plurality of read-out frames, it is possible to obtain a processing result with high accuracy using one frame image signal.

However, the face detection processing, the face recognition processing, or the facial expression determination processing is performed after combining the plurality of image data of different exposure amounts. Therefore, the time necessary for obtaining a result of the processing increases compared to the case where the combining process is not performed, though the increase is not as large as in the case where the face detection processing or the like is performed on each of the plurality of frames.

SUMMARY OF THE INVENTION

Therefore, it is an object of the present invention to provide an imaging apparatus and an image processing method, which can realize appropriate control of detection processing considering a balance between accuracy and responsiveness in moving image processing including combining images.

According to one aspect of the present invention, an image processing apparatus for processing a plurality of image data obtained by picking up images of an object in different photographing conditions, comprises: an obtaining unit configured to obtain the plurality of image data; a combining unit configured to combine the plurality of image data and generate combined image data; and a control unit configured to control to execute determination processing for determining the object on one of the plurality of image data and the generated combined image data, wherein the control unit switches between execution of the determination processing on at least one of the plurality of image data and execution of the determination processing on the combined image data.

Further, according to another aspect of the present invention, there is provided an image processing apparatus for processing a plurality of image data obtained by picking up images of an object in different photographing conditions, comprises: an obtaining unit configured to obtain the plurality of image data; a combining unit configured to combine the plurality of image data and generate combined image data; a first determination unit configured to execute first determination processing for detecting the object on at least one of the plurality of image data; and a second determination unit configured to execute second determination processing for specifying the object detected by the first determination unit on the combined image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the present invention will be described in detail below with reference to the drawings.

Figure 1:
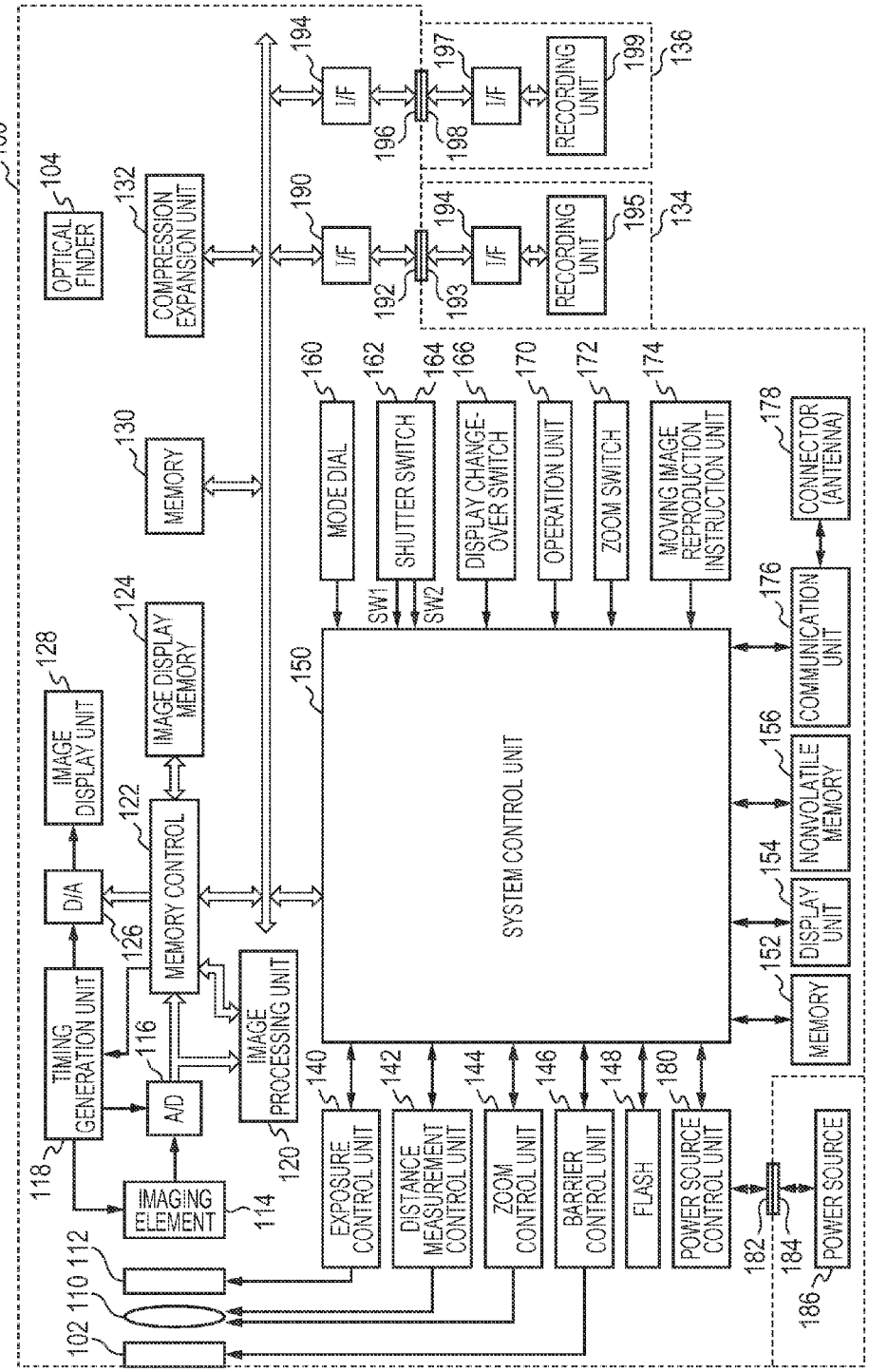
FIG. 1 is a block diagram of an imaging apparatus to which an imaging apparatus according to an embodiment of the present invention is applied.

FIG. 1 is a diagram illustrating a block structure of an imaging apparatus according to an embodiment of the present invention in a case where the imaging apparatus is applied to an imaging apparatus having a face detection function of a photographing image. Further, the face detection function itself may be a structure separated from the imaging apparatus, or the structure of the imaging apparatus as the face detection function. In both cases, the image processing apparatus of this embodiment has a control structure for controlling execution of the face detection function and a face recognition function during an image processing operation. In this embodiment, the face detection function means a function of detecting an object which has general features of a face, and the face recognition function means a function of detecting a face having a specific feature among faces. In addition, a face detection method and a face recognition method themselves are not subjects of the present invention, and any method can be used as the face detection method or the face recognition method. In addition, in this embodiment, the face detection for specifying an area in the image where a face exists is mentioned as first determination processing for detecting an object from an amount of feature of the image. In addition, the face recognition (person recognition) for identifying which is the detected face is, is mentioned as second determination processing. However, the determination processing in the present invention is not limited to these processings. Other determination processings such as facial expression determination processing may be used as long as the above-mentioned relationship is satisfied between two determination processings.

An imaging apparatus 100 illustrated in FIG. 1 includes a photographing lens 110, a mechanical shutter 112 having an iris function, an imaging element 114 for converting an optical image into an electric signal, and an A/D converter 116 for converting an analog signal output of the imaging element 114 into a digital signal. In addition, the imaging apparatus 100 includes a timing generation unit 118 for supplying a clock signal or a control signal to the imaging element 114, the A/D converter 116, and a D/A converter 126, and this timing generation unit 118 is controlled by a memory control unit 122 and a system control unit 150. Besides the mechanical shutter 112, it is possible to control a reset timing of the imaging element 114 so as to control accumulation time as an electronic shutter, which can be used for moving image photographing or the like.

An image processing unit 120 performs predetermined pixel interpolation processing or color conversion processing on data from the A/D converter 116 or data from the memory control unit 122. In addition, the image processing unit 120 performs image clip processing and magnification processing so that an electronic zoom function can be realized. In addition, the image processing unit 120 performs a predetermined calculation process using picked-up image data, and the system control unit 150 controls an exposure control unit 140 and a distance measurement control unit 142 based on the obtained calculation result, so as to perform through-the-lens (TTL) type auto focus (AF) processing, auto exposure (AE) processing, and electric flash (EF) processing. Further, the image processing unit 120 performs a predetermined calculation process using the picked-up image data so as to perform TTL type auto white balance (AWB) processing based on the obtained calculation result.

The memory control unit 122 controls the A/D converter 116, the timing generation unit 118, the image processing unit 120, an image display memory 124, the D/A converter 126, a memory 130, and a compression and expansion unit 132. The data from the A/D converter 116 is written into the image display memory 124 or the memory 130 via the image processing unit 120 and the memory control unit 122 or directly via the memory control unit 122.

The imaging apparatus 100 further includes the image display memory 124, the D/A converter 126, and an image display unit 128 including a TFT LCD or the like. Image data for display written into the image display memory 124 is displayed on the image display unit 128 via the D/A converter 126. When the picked-up image data is sequentially displayed using the image display unit 128, an electronic finder function can be realized. In addition, the image display unit 128 can arbitrarily turn on and off the display based on an instruction from the system control unit 150. When the display is turned off, power consumption of the imaging apparatus 100 can be reduced significantly.

The memory 130 stores photographed still images or moving images and has a sufficient storage capacity for a predetermined number of still images or a predetermined time period of moving image. In this way, a large amount of images can be written into the memory 130 at a high speed in continuous photographing for sequentially photographing a plurality of still images or in panorama photographing. In addition, the memory 130 can also be used as a working area for the system control unit 150.

The compression and expansion unit 132 compresses and expands image data by adaptive discrete cosine transform (ADCT) or the like. The compression and expansion unit 132 reads an image stored into the memory 130 so as to perform compression processing or expansion processing, and writes the processed data in the memory 130.

The exposure control unit 140 controls the shutter 112 having the iris function and also has a flashlight modulation function attained in cooperation with a flash 148. The distance measurement control unit 142 controls focusing of the photographing lens 110, a zoom control unit 144 controls zooming of the photographing lens 110, and a barrier control unit 146 controls an operation of a protection unit 102 as a barrier.

The flash 148 also has a light projection function of AF fill light and a flashlight modulation function.

The exposure control unit 140 and the distance measurement control unit 142 are controlled using the TTL method, and the system control unit 150 controls the exposure control unit 140 and the distance measurement control unit 142 so as to adjust photographing conditions based on the calculation result obtained when the picked-up image data is calculated by the image processing unit 120.

The system control unit 150 controls the entire imaging apparatus 100, and a memory 152 stores constants, variables, programs, and the like for the system control unit 150 to operate. The system control unit 150 loads and executes the program stored in the memory 152 so as to control individual units of the imaging apparatus. Further, the face detection function is realized together with control of the image processing unit 120 when a CPU of the system control unit 150 executes the program.

A display unit 154 includes a liquid crystal display apparatus, a speaker, and the like, and displays operation states, messages, and the like using characters, graphics, sounds, and the like in accordance with execution of the program by the system control unit 150. The display unit 154 is disposed at a position near an operation unit of the imaging apparatus 100, which is easily visible, and includes a combination of an LCD, an LED, and a sound generation element, for example. In addition, a part of functions of the display unit 154 are disposed in an optical finder 104.

As an electrically erasable and recordable nonvolatile memory 156, an EEPROM is used, for example. Operation units 160, 162, 164, 166, 170, 172, and 174 are disposed for inputting various operation instructions for the system control unit 150. As these operation units, a switch, a dial, a touch panel, a pointing device using viewpoint detection, or an audio recognition apparatus are used alone or in combination.

Here, these operation units 160, 162, 164, 166, 170, 172, and 174 are specifically described.

The mode dial switch 160 can switch and set various function modes such as power off, a still image photographing mode, a panorama photographing mode, a moving image photographing mode, a snap moving image photographing mode, a reproduction mode, a multi-screen reproduction mode, a PC connection mode, a TV reception mode, and the like.

The first shutter switch (SW1) 162 is turned on when operating a shutter button halfway so as to instruct to start photographing preparation operations such as the auto focus (AF) processing, the auto exposure (AE) processing, the auto white balance (AWB) processing, and the like.

The second shutter switch (SW2) 164 is turned on when operation of the shutter button is completed. When the second shutter switch is turned on, it is instructed to start an image importing process of writing a signal read out from the imaging element 114 as image data into the memory 130 via the A/D converter 116 and the memory control unit 122, and a developing process using calculation by the image processing unit 120 and the memory control unit 122. Simultaneously, it is also instructed to start a recording process of reading out image data from the memory 130, performing the compression processing by the compression and expansion unit 132 so as to generate record data, and writing the record data into a recording medium 134 or 136. In this way, start of the series of three processes is instructed by turning on the second shutter switch.

The display change-over switch 166 can switch display on the image display unit 128. This function enables power saving by disconnecting current supply to the image display unit including a TFT LCD or the like when photographing is performed using the optical finder 104.

The operation unit 170 includes various buttons, a touch panel, and the like.

The zoom switch unit 172 as a zoom operation unit is used by the user to issue a magnification change instruction of the picked-up image. The zoom switch unit 172 is hereinafter also referred to as the zoom switch 172. This zoom switch 172 includes a telephoto switch for changing an image pickup angle to a telephoto side and a wide angle switch for changing the image pickup angle to a wide angle side. Using this zoom switch 172, change of the image pickup angle of the photographing lens 110 is instructed to the zoom control unit 144, which becomes a trigger for an optical zoom operation. In addition, using the zoom switch 172 also becomes a trigger for image clip by the image processing unit 120 or an electronic change of the image pickup angle by the pixel interpolation processing.

When the moving image reproduction instruction unit 174 is operated in a predetermined time period after the moving image photographing, reproduction of the photographed moving image can be started. The above is the description for the operation units.

A power source control unit 180 includes a battery detection unit, a DC-DC converter, a switch unit for switching a block to be powered, and the like, and detects a presence or absence of a battery, a type of the battery, and a remaining battery capacity. In addition, the power source control unit 180 controls the DC-DC converter based on a result of the detection and the instruction from the system control unit 150 so as to supply necessary voltages to the individual units including the recording medium for necessary periods.

The imaging apparatus 100 further includes a power source unit 186 including a connector 182, a connector 184, a primary battery such as an alkaline battery or a lithium battery, a secondary battery such as a NiCd battery, a NiMH battery, or a Li battery, an AC adapter, and the like.

The imaging apparatus 100 further includes interfaces 190 and 194 with recording media such as a memory card and a hard disk, and connectors 192 and 196 for connection to recording media such as a memory card and a hard disk.

Further, this embodiment is described with an assumption that two systems including the interfaces and the connectors for mounting recording media are disposed. As a matter of course, the number of the systems is arbitrary, and a single or a plurality of systems including the interfaces and the connectors for mounting recording media may be disposed. In addition, it is possible to adopt a structure in which interfaces and connectors in different standards are combined. It is also possible to adopt a structure in which the interface and the connector that conform the SD card standard or the CF card standard are used.

Further, it is possible to adopt a structure in which the interfaces 190 and 194 and the connectors 192 and 196 conforming the PCMCIA card standard or the compact flash (CF) card standard are used. In other words, the imaging apparatus can be connected to various types of communication cards such as a LAN card, a modem card, a USB card, an IEEE1394 card, an SCSI card, and a PHS. In this way, the imaging apparatus can transfer/receive image data and management information attached to the image data to/from another computer or peripheral equipment such as a printer.

The protection unit 102 is a barrier that covers an imaging unit including the lens 110 of the imaging apparatus 100 so as to prevent the imaging unit from being dirty or damaged.

The optical finder 104 can perform photography using only the optical finder without using the electronic finder function by the image display unit 128.

A communication unit 176 has various communication functions such as a USB, an IEEE1394, a LAN, and wireless communication. A connector 178 connects the imaging apparatus 100 with other equipment by the communication unit 176. In the case of wireless communication, an antenna is used instead of the connector 178.

The recording medium 134 such as a memory card or a hard disk includes a recording unit 195 including a semiconductor memory or a magnetic disk, an interface 194 for the imaging apparatus 100, and a connector 193 for connection to the imaging apparatus 100.

The recording medium 136 such as a memory card or a hard disk includes a recording unit 199 including a semiconductor memory or a magnetic disk, an interface 197 for the imaging apparatus 100, and a connector 198 for connection to the imaging apparatus 100.

Figure 2:
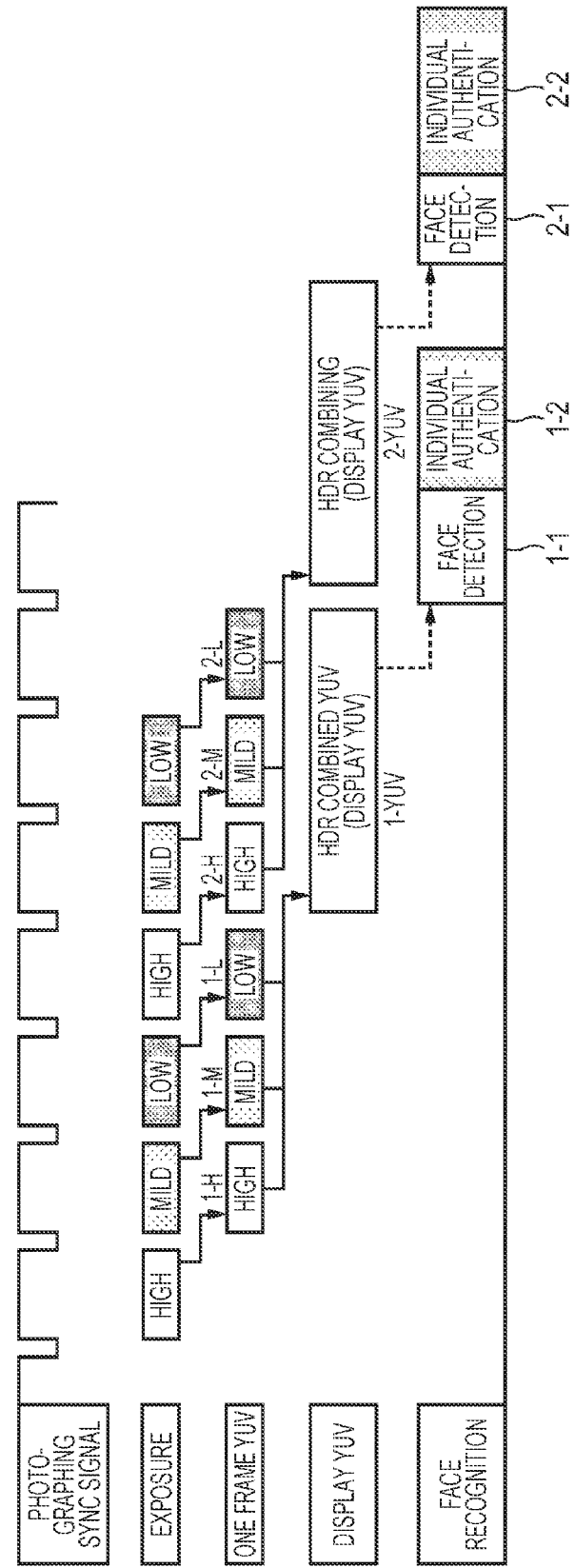
FIG. 2 is a chart illustrating an example of an image processing operation according to an embodiment of the present invention.
Figure 3:
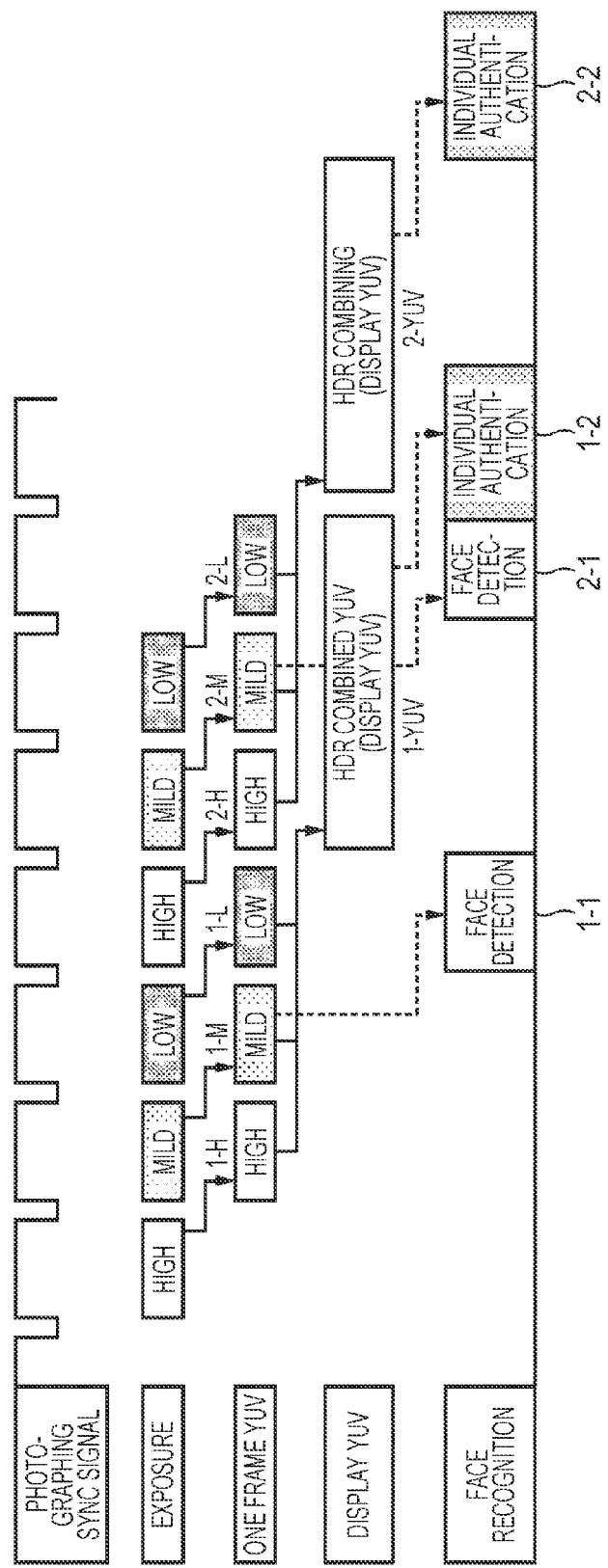
FIG. 3 is a chart illustrating an example of the image processing operation according to the embodiment of the present invention.
Figure 4:
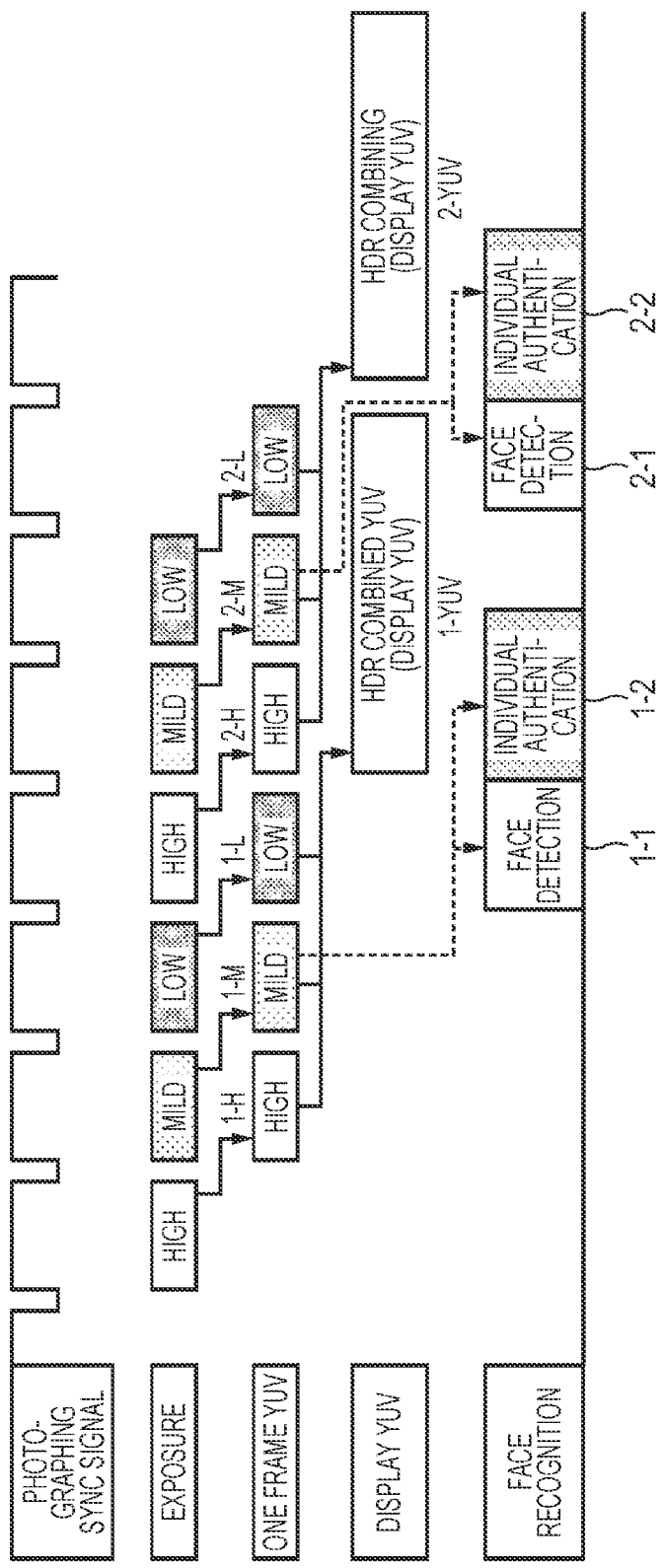
FIG. 4 is a chart illustrating an example of the image processing operation according to the embodiment of the present invention.

Next, with reference to FIGS. 2 to 4, there are described execution examples of the face detection function and the face recognition function in the operation of the image processing apparatus according to this embodiment. FIGS. 2 to 4 illustrate an example of execution (start) timings of the face detection function and the face recognition function in the operation of the image processing apparatus according to this embodiment until YUV data for displaying or recording a moving image is generated from the picked-up moving image signal (plurality of moving image frames). The start timing determines on which moving image data the face detection or the face recognition is to be performed.

In high dynamic range (HDR) combination performed in the image processing operation of this embodiment, in order to expand a dynamic range of the moving image signal, frames of different exposure conditions are read out at a three-frame period, and combined to generate the moving image frame images. In FIGS. 2 to 4, the frame expressed as High is a frame of a read-out moving image signal that is picked up with overexposure which is higher exposure than proper exposure, and the frame expressed as Mild is a frame of a read-out moving image signal that is picked up with proper exposure. In addition, the frame expressed as Low is a frame of a read-out moving image signal that is picked up with underexposure which is lower exposure than proper exposure. These three types of exposure are repeated while frames of the moving image signal are read out. Then, the image processing apparatus of this embodiment obtains these three read-out images, converts each image into YUV image data, and combines the YUV image data of the three frames so as to generate an HDR combined moving image (YUV image). There are considered various combining methods, and any method can be used in the present invention. In this embodiment, with reference to a pixel value of the proper exposure, the overexposure image is mainly used in a dark area having a low pixel value, the underexposure image is mainly used in a bright area having a high pixel value, and the proper exposure image is mainly used in an area having an intermediate pixel value, so as to perform the combining. In addition, a combinating ratio in each area can be changed in accordance with other various conditions. For instance, in a moving object area, a fixed combining ratio is used for combining. Further, the HDR combination is performed after image data of RGB Bayer array is converted into the YUV image data in this embodiment, but this is not a limitation. It is possible to perform the HDR combination in a state of the RGB Bayer array.

Here, considering the appropriate face detection and face recognition having good responsiveness as the object of the present invention, the following three operation modes are considered. It is considered that the dark portions or flared highlight portions existing in the face area in each image before combining are reduced in the image after combining by performing the face detection and the face recognition after the HDR combination, and hence accuracy of detection and recognition is enhanced (first operation mode). However, if the face detection and the face recognition are sequentially performed after the HDR combination process, responsiveness is not so good. Therefore, in view of that accuracy of the face detection is less required to be high as that of the face recognition, the face detection is performed based on image data before combining (moving image data), and the face recognition is performed based on image data after combining (combined image data) (second operation mode). Then, the face detection can be performed from each image data before combining without waiting the HDR combination process, and the face recognition can be performed based on the image data after combining so that the accuracy of the face recognition that is required to be higher than that of the face detection can be secured. However, if the image after combining images is not clear because the object is moving or other reasons, there may be considered a case where accuracy of the face detection result or the face recognition result is oppositely decreased. Therefore, in that case, it is considered to perform the face detection and the face recognition from image data before combining (third operation mode).

The example of the operation mode (first operation mode) illustrated in FIG. 2 is an operation example in which the face detection and the person recognition (face recognition) are performed on the image after the HDR combination. In this embodiment, the face detection is to detect a human face, which means to specify a human face area in the YUV image based on an edge of the face and colors of areas. In addition, the face recognition is to specify a person's face by detecting organs such as eyes, a nose, and a mouth in the face area detected by the face detection and by matching the detected organ with organ information of the person, which is registered in advance. As a matter of course, without limiting to the above-mentioned detection method, it is possible to perform the organ detection using stored parts information for general purpose in the face detection as well. The same is true in the operation examples illustrated in FIG. 3 and FIG. 4.

FIG. 3 illustrates another operation example (second operation mode). The operation example illustrated in FIG. 3 is an example of performing the face detection on the YUV data of the read-out moving image signal picked up with the proper exposure, which is expressed as Mild among the three frames before combining. In parallel with the face detection, three YUV image data generated from the data read by three types of exposures are combined so as to generate an HDR combined YUV image. Further, the person recognition is performed on the face area detected from the images before combining with respect to the image after the HDR combination. Here, the image on which the face detection is performed is not limited to the proper exposure image but may be the underexposure image or the overexposure image. For instance, because the underexposure image has the least possibility of flared highlight, the face detection can be performed even in a scene where the face area is relatively bright. Further, it is possible to perform the face detection with use of a plurality of images among the three images before the HDR combination. In this case, it is possible to enhance a detection rate or a tracking performance compared to the case where the detection is performed only by one of the images of exposures.

Further, FIG. 4 illustrates another operation example (third operation mode). In the operation example illustrated in FIG. 4, the face detection and the person recognition are performed on the read-out YUV data with the proper exposure, which is expressed as Mild among the YUV image data of the three frames before combining. Again, the image on which the face detection and the person recognition are performed is not limited to the proper exposure image but may be the underexposure image or the overexposure image. Because the underexposure image has the least possibility of flared highlight, the face detection can be performed even in a scene where the face area is relatively bright. Further, it is possible to perform the face detection with use of a plurality of images among the three images before the HDR combination. In this case, it is possible to enhance a detection rate or a tracking performance compared to the case where the detection is performed only by one of the images of exposures.

The first operation mode described above emphasizes accuracy of the face detection and the face recognition and is effective for a case of high contrast in which the face detection cannot be performed well by the image before combining such as in a case where a face is partially shaded from the light. The second operation mode emphasizes responsiveness more than the first operation mode by performing the face detection before the YUV image combination. The third operation mode emphasizes responsiveness most among the three operation modes by performing the face recognition and the face detection before the YUV image combination. In addition, if a positional difference is large due to fast motion of the object or vibration, the third operation mode is effective because the combined image may not be clear after the image combination. In this way, the three operation modes described above have different conforming objects or different accuracies and responsiveness until a person is identified from the exposure. Therefore, by using these three operation modes properly in accordance with conditions including a vibration amplitude of a vibration detection unit such as a gyro, an object motion, and a scene type, it is possible to perform the face detection and the face recognition suitable for a scene feature. In this embodiment, after performing the face detection, it is determined whether the face is detected to determine whether or not the operation mode is suitable for the picked-up image, while determining a face motion as an object motion.

Figure 5:
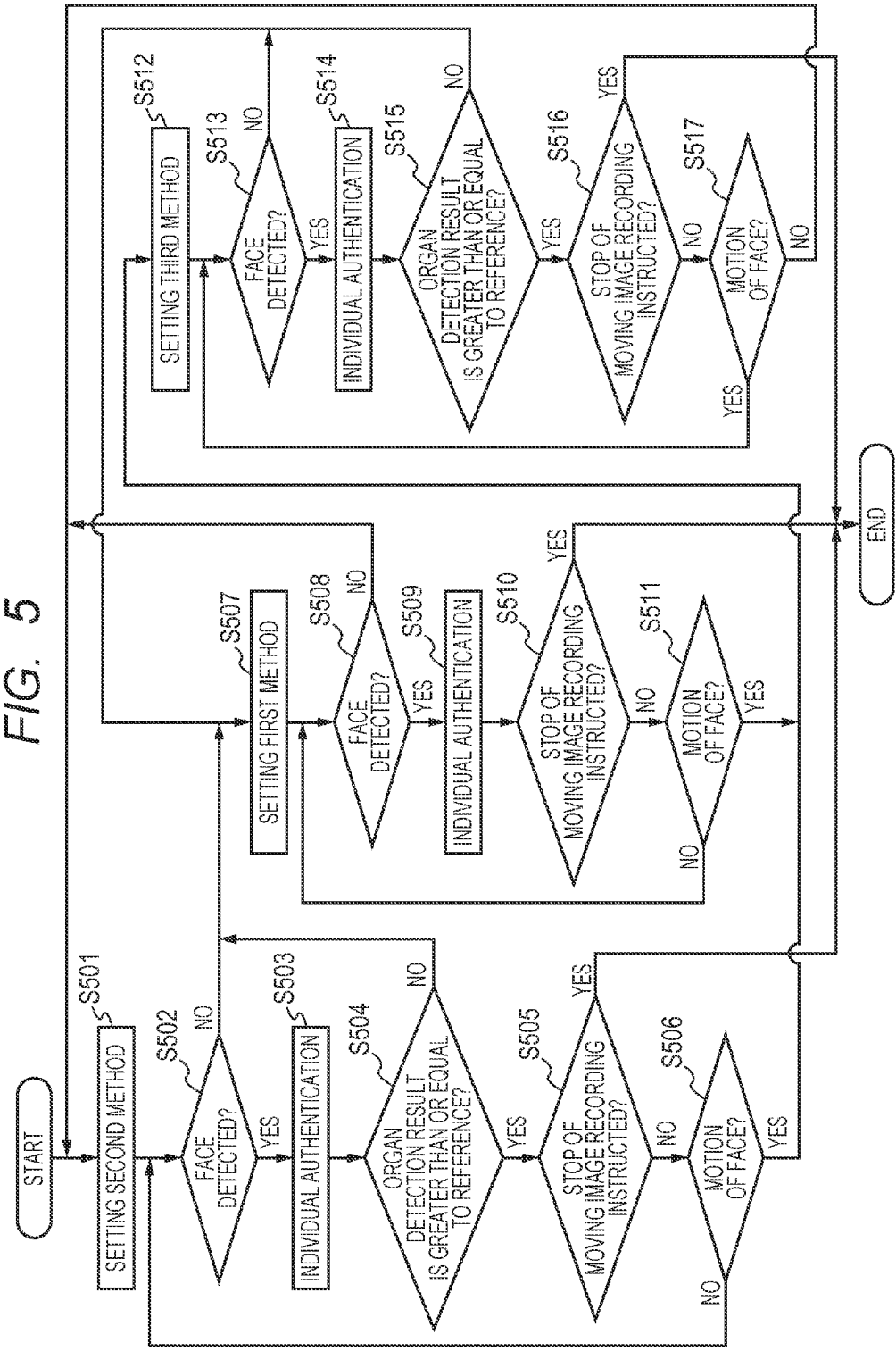
FIG. 5 is a flowchart illustrating the image processing operation according to the embodiment of the present invention.

Next, there is described an example in which the above-mentioned three operation modes are switched so as to perform the face detection function and the face recognition function in the image processing operation with reference to FIG. 5. FIG. 5 is a flowchart of the image processing operation according to this embodiment. This operation is realized when the CPU of the system control unit 150 loads and executes the program stored in the memory 152.

First, in S501, the system control unit 150 sets the second operation mode as a default setting. Next, the process proceeds to S502, in which the system control unit 150 performs the face detection in accordance with the second operation mode described above and determines whether or not a face is detected as a result thereof. If a face is not detected, the system control unit 150 proceeds to S507, in which the first operation mode is set. If a face is detected, the system control unit 150 performs the person recognition process in S503. The person recognition in this case is also performed in accordance with the timing in the second operation mode. Then, the process proceeds to S504, in which the system control unit 150 determines whether or not a degree of matching (degree of confidence) between the result of the organ detection performed in the person recognition and one of registered persons is a predetermined reference value or larger. If the degree of matching is not the reference value or larger, the process proceeds to S507 in which the first operation mode is set. If the degree of matching is the reference value or larger, the process proceeds to S505.

In S505, the system control unit 150 determines whether or not the user instructs to stop recording of the moving image. If the user instructs to stop recording, the system control unit 150 finishes this operation. If the user does not instruct to stop recording, the process proceeds to S506.

In S506, the system control unit 150 determines whether or not the detected face moves. For instance, whether or not the detected face moves is determined by comparing coordinates with those in the last face detection result, or by storing time-sequentially coordinates of the detected face so as to determine whether or not a variation of coordinates of the detected face is a predetermined value or larger. Other than that, it is possible that a state of the face such as an inclination of the face or whether or not the face is a profile is stored based on a result of the organ detection and whether or not the face moves is determined based on a change of the stored state. In a case where no motion of the face is determined, the system control unit 150 proceeds to S502 in which the face detection is performed in the second operation mode.

In a case where a motion of the face is determined in S506, the system control unit 150 switches to the third operation mode in S512, and the process proceeds to S513. In S513, the system control unit 150 determines whether or not a face is detected as a result of the face detection. If a face is not detected, the process proceeds to S507 in which the first operation mode is set. If a face is detected in S513, the system control unit 150 proceeds to S514 in which the person recognition process is performed. After that, the system control unit 150 proceeds to S515 in which a degree of matching (a correlation value or the like) between a result of the organ detection performed in the person recognition and one of registered persons is the reference value or larger. If the degree of matching is not the reference value or larger, the process proceeds to S507 in which the first operation mode is set. If the degree of matching is the reference value or larger, the process proceeds to S516.

In S516, the system control unit 150 determines whether or not stop of recording of the moving image is instructed. If the stop is instructed, this operation is stopped. If the stop is not instructed, the process proceeds to S517. In S517, the system control unit 150 determines whether or not there is a face motion. If there is a face motion, the process proceeds to S513 while maintaining setting of the third operation mode. If there is no face motion, the process proceeds to S501 in which the second operation mode is set.

When proceeding from S502, S504, S513, or S515 to S507 in which the first operation mode is set, the system control unit 150 determines whether or not a face is detected as a result of the face detection in S508. As a result, in a case where a face is not detected, the process proceeds to S501 in which the second operation mode is set. In a case where it is determined in S508 that a face is detected, the system control unit 150 proceeds to S509 in which the person recognition is performed on the detected face. After that, the process proceeds to S510 in which it is determined whether or not the user instructs to stop recording of the moving image. If the user instructs to stop recording, this operation is stopped. If the user does not instruct to stop recording, the process proceeds to S511. In S511, the system control unit 150 determines whether or not there is a face motion. If there is a face motion, the process proceeds to S512 in which the operation mode is switched to the third operation mode. If there is no face motion, the face detection in S508 is continued in the first operation mode.

In this way, the execution method of the face detection and the person recognition of the detected face is changed based on conditions such as whether or not a face is detected, whether or not a result of the organ detection of the detected face is the reference value or larger, and whether or not there is a face motion. Thus, it is possible to select the execution method of the face detection and the face recognition suitable for the situation.

Further, it is possible to change as necessary the reference value of the organ detection for recognizing a face and the predetermined reference value for determining whether or not a face is detected in the operation illustrated in the flowchart of FIG. 5. In addition, the switching method is not limited to that in the example of FIG. 5 but may employ other switching structure. Further, it is possible to adopt a structure in which after switching from the default setting, one of the first to third operation modes is continued without switching for at least a predetermined time period. In addition, it is possible to adopt a structure in which one of the three operation modes for operation can be manually set regardless of the face detection result or the face motion. Further, in a scene requiring a high frame rate or high responsiveness such as a sports mode, it is possible to switch the operation mode to the second or the third operation mode in accordance with how high responsiveness is required in the photographing mode.

Modification

Figure 6:
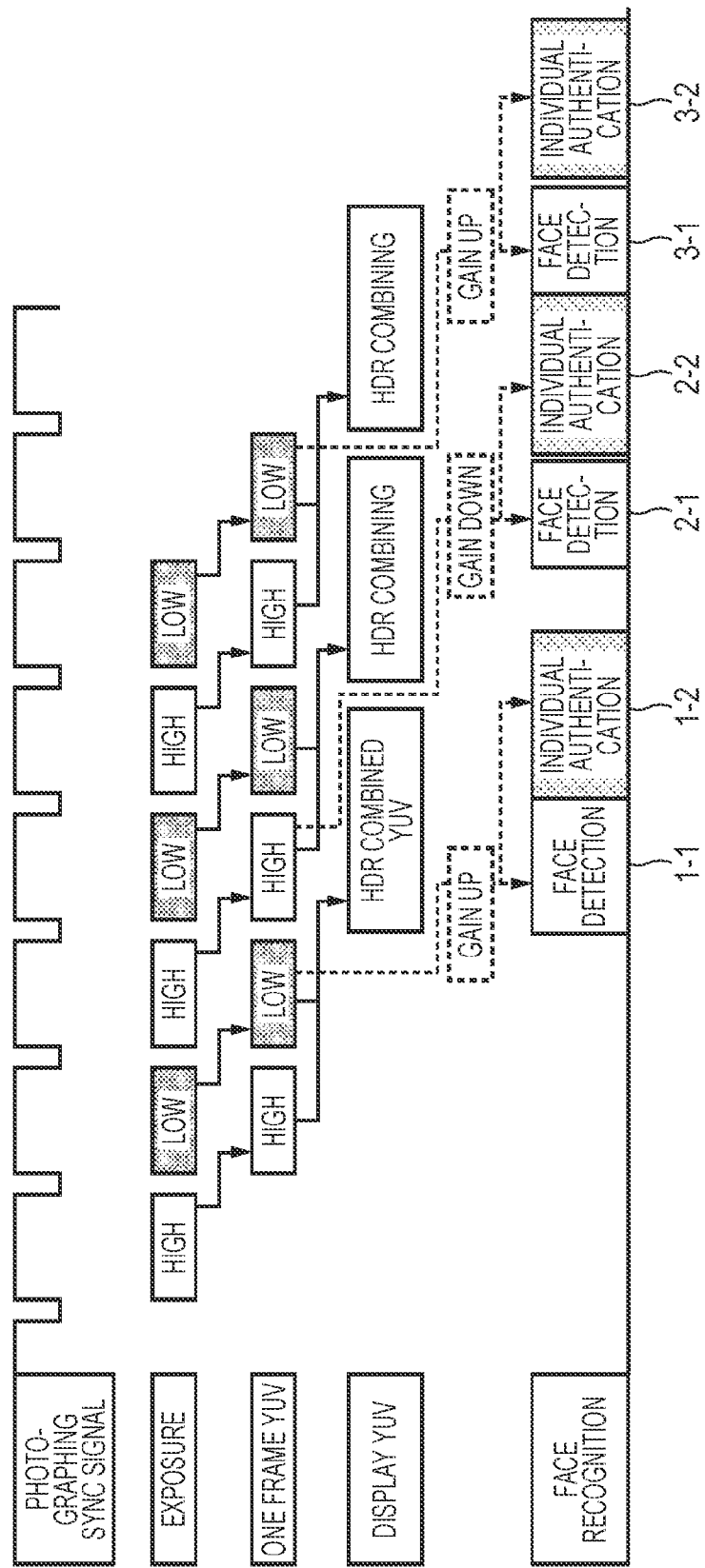
FIG. 6 is a chart illustrating a modification of the image processing operation according to the embodiment of the present invention.

This modification is an example of the image processing operation in a case where the HDR combined image is generated not from the three frames as described above but from two frames including an overexposure frame and an underexposure frame. An operation example (operation mode) of the face detection function and the face recognition function in the operation of the image processing apparatus in this case is illustrated in FIG. 6. The operation example illustrated in FIG. 6 corresponds to the third operation mode in the above-mentioned embodiment.

In the case of FIG. 6, because the moving image is generated from the overexposure image and the underexposure image of an object, there is no frame of the moving image signal picked up by proper exposure. Therefore, in this modification, the face detection and the face recognition are performed by alternately using a frame corresponding to proper exposure, which is obtained by decreasing a gain of the YUV data of the moving image frame picked up by overexposure every two frames, and a frame corresponding to proper exposure, which is obtained by increasing a gain of the moving image frame picked up by underexposure.

In other words, when generating the combined image based on the two frames including the overexposure frame and the underexposure frame, the gain increase and the gain decrease as illustrated in FIG. 6 are used for the moving image data on which one of the face detection function and the face recognition function is performed. Thus, also in this modification, it is possible to perform the face detection and the face recognition in the above-mentioned second operation mode or third operation mode in the image processing operation. In addition, similarly to the image processing operation in a case where the HDR combined image is generated from the three frames, it is possible to switch the operation in this modification in accordance with the flow illustrated in FIG. 5.

In this modification described above, it is possible to constitute the two frames of a frame of the moving image signal picked up by proper exposure and a frame of the moving image signal picked up by underexposure. In this case, brightness correction may be only the gain increase of underexposure to be adjusted to the proper exposure. When the photographing and combining are performed only by two imaging conditions of the proper exposure and the underexposure, the effect of improving blocked up shadows is decreased compared to a case where the overexposure image is used for combining, but gradation of an object of intermediate luminance existing in the proper exposure can be reproduced more finely.

In addition, another modification is an example applied to a case where the HDR combined image is generated by combining images of a plurality of exposure conditions, which are picked up by setting different exposure times for every predetermined number of lines in one frame. This generation method of the HDR combined image is disclosed in Japanese Patent Application Laid-Open No. 2011-244309, for example. This generation method has a feature that the HDR combined image can be generated even from an image obtained by imaging one frame compared to the embodiments described above. For instance, as for the overexposure frame and the underexposure frame obtained by imaging with alternate setting of overexposure and underexposure for every two lines, the face detection processing and the face recognition processing can be performed in the second operation mode or in the third operation mode similarly to the embodiments described above.

According to the present invention described above, it is possible to perform the face recognition method with an optimal accuracy in accordance with the object or the scene while maintaining responsiveness from reading out the frame until the face recognition result is obtained. In other words, in moving image processing accompanying image combination, when performing the first determination processing and the second determination processing in which the object is specified by the first determination based on the first determination processing, it is possible to realize control of appropriate determination processing with good responsiveness.

In the embodiment described above, functions of the processes illustrated in FIG. 5 are realized when the program for realizing the functions of the processes is read out from the memory, and the CPU of the control unit 150 executes the program.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-138856, filed Jul. 2, 2013, which is hereby incorporated by reference herein in its entirety.

What is claimed is:

1. An image processing apparatus for processing a plurality of image data obtained by picking up images of an object in different photographing conditions, the image processing apparatus comprising:
   at least one processor functioning as:
   an obtaining unit configured to obtain the plurality of image data;
   a combining unit configured to combine the plurality of image data and generate combined image data;
   a first determination unit configured to execute first determination processing for detecting the object on at least one of the plurality of image data; and
   a second determination unit configured to execute second determination processing for specifying the object detected by the first determination unit on the combined image data, wherein the first determination processing is face detection processing for detecting a face from image data, and the second determination processing is at least one of face recognition processing for identifying which is the face detected in the first determination processing, and facial expression determination processing for determining a facial expression of the face detected in the first determination processing.

2. The image processing apparatus according to claim 1, wherein the photographing conditions include exposure conditions, and the plurality of picked up image data include image data picked up with overexposure, image data picked up with proper exposure, and image data picked up with underexposure.

3. An imaging apparatus, comprising:
the image processing apparatus according to claim 1; and
a control unit configured to control a storage unit to store a moving image including the combined image data generated by the combining unit.

4. A control method for an image processing apparatus for processing a plurality of image data obtained by picking up images of an object in different photographing conditions, the control method comprising:
obtaining the plurality of image data;
combining the plurality of image data and generating combined image data;
executing first determination processing for detecting the object on at least one of the plurality of image data; and
executing second determination processing for specifying the object detected by the first determination processing on the combined image data,
wherein the first determination processing is face detection processing for detecting a face from image data, and the second determination processing is at least one of face recognition processing for identifying which is the face detected in the first determination processing, and facial expression determination processing for determining a facial expression of the face detected in the first determination processing.

5. A non-transitory computer-readable storage medium storing a program for causing a computer to control an image processing apparatus for processing a plurality of image data obtained by picking up images of an object in different photographing conditions, the program causing the computer to:
obtain the plurality of image data;
combine the plurality of image data and generate combined image data;
execute first determination processing for detecting an object on at least one of the plurality of image data; and
execute second determination processing for specifying the object detected by the first determination on the combined image data,
wherein the first determination processing is face detection processing for detecting a face from image data, and the second determination processing is at least one of face recognition processing for identifying which is the face detected in the first determination processing, and facial expression determination processing for determining a facial expression of the face detected in the first determination processing.

6. The image processing apparatus according to claim 1, wherein the first determination unit executes the first determination processing on the image data picked up with underexposure.

7. The image processing apparatus according to claim 1, wherein the first determination unit executes the first determination processing on more than one image data among the plurality of image data.

8. An image processing apparatus for processing a plurality of image data obtained by picking up images of an object in different photographing conditions, the image processing apparatus comprising:
at least one processor functioning as:
an obtaining unit configured to obtain the plurality of image data;
a combining unit configured to combine the plurality of image data and generate combined image data;
a first determination unit configured to execute first determination processing for detecting the object on at least one of the plurality of image data; and
a second determination unit configured to execute second determination processing for specifying the object detected by the first determination unit on the combined image data, wherein when a motion of the detected object is determined, the second determination unit executes the second determination processing on at least one of the plurality of image data.

9. A control method for an image processing apparatus for processing a plurality of image data obtained by picking up images of an object in different photographing conditions, the control method comprising:
obtaining the plurality of image data;
combining the plurality of image data and generating combined image data;
executing first determination processing for detecting the object on at least one of the plurality of image data; and
executing second determination processing for specifying the object detected by the first determination processing on the combined image data,
wherein when a motion of the detected object is determined, the second determination processing is executed on at least one of the plurality of image data.

10. A non-transitory computer-readable storage medium storing a program for causing a computer to control an image processing apparatus for processing a plurality of image data obtained by picking up images of an object in different photographing conditions, the program causing the computer to:
obtain the plurality of image data;
combine the plurality of image data and generate combined image data;
execute first determination processing for detecting an object on at least one of the plurality of image data; and
execute second determination processing for specifying the object detected by the first determination on the combined image data,
wherein when a motion of the detected object is determined, the second determination processing is executed on at least one of the plurality of image data.

* * * * *